US 6,655,166 B1

(12) United States Patent
Williams

(10) Patent No.: US 6,655,166 B1
(45) Date of Patent: Dec. 2, 2003

(54) ICE CRUSHER HOUSING

(75) Inventor: Alston E. Williams, Irvine, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/659,126

(22) Filed: Sep. 11, 2000

Related U.S. Application Data
(60) Provisional application No. 60/153,480, filed on Sep. 10, 1999.

(51) Int. Cl.[7] .................................................. F25C 5/02
(52) U.S. Cl. ...................... 62/320; 62/344; 241/DIG. 17
(58) Field of Search ............. 62/320, 344; 241/DIG. 17

(56) References Cited

U.S. PATENT DOCUMENTS

| | | | |
|---|---|---|---|
| 2,899,140 A | * 8/1959 | Hellyer | ........................ 241/190 |
| 3,602,441 A | * 8/1971 | Alvarez | ........................ 241/101.2 |
| 3,843,067 A | * 10/1974 | Prada | ........................ 241/190 |
| 3,951,351 A | 4/1976 | Ernster et al. | |
| 4,071,789 A | 1/1978 | Ernster et al. | |
| 4,176,527 A | * 12/1979 | Linstromberg et al. | ....... 62/320 |
| 4,187,992 A | 2/1980 | Del Valle | |
| 4,209,999 A | 7/1980 | Falk et al. | |
| 4,619,380 A | 10/1986 | Brooks | |
| 4,620,476 A | 11/1986 | Brym | |
| 4,627,556 A | 12/1986 | Brooks | |
| 4,632,319 A | 12/1986 | Schlund et al. | |
| 4,653,281 A | 3/1987 | Van Der Veer | |
| 4,776,755 A | 10/1988 | Björkestam et al. | |
| 4,972,999 A | * 11/1990 | Grace | ........................ 241/30 |
| 5,012,580 A | 5/1991 | Goulter | |
| 5,033,273 A | 7/1991 | Buchser et al. | |
| 5,050,777 A | 9/1991 | Buchser | |
| 5,056,688 A | 10/1991 | Goetz et al. | |
| 5,125,242 A | 6/1992 | von Blanquet | |
| 5,139,183 A | 8/1992 | Buchser et al. | |
| 5,148,996 A | 9/1992 | Fletcher et al. | |
| 5,169,075 A | 12/1992 | Galanty | |
| 5,381,668 A | 1/1995 | Morioka | |
| 5,697,561 A | 12/1997 | Plank et al. | |
| 5,947,342 A | * 9/1999 | Song | ........................ 222/413 |
| 6,050,097 A | 4/2000 | Nelson et al. | |
| 6,082,130 A | 7/2000 | Pastryk et al. | |
| 6,109,476 A | 8/2000 | Thompson et al. | |
| 6,176,090 B1 | 1/2001 | Ufema | |
| 6,425,259 B2 | 7/2002 | Nelson et al. | |
| 6,438,976 B2 | 8/2002 | Shapiro et al. | |

* cited by examiner

*Primary Examiner*—William E. Tapolcai
(74) *Attorney, Agent, or Firm*—H. Neil Houser, Esq.; Armstrong Teasdale LLP

(57) ABSTRACT

An ice bucket assembly includes an ice bucket container and a housing assembly. The housing assembly includes a housing and a cover. The housing includes a plurality of tabs configured to engage a plurality of openings disposed within the ice bucket container. The cover includes a plurality of tabs which permit a user to grasp the cover during removal or installation of the cover. When installed, the housing assembly is positioned above a dispensary opening at a front of the ice bucket container. As a result, crushed ice is immediately dispensed from the ice bucket container.

13 Claims, 2 Drawing Sheets

ICE CRUSHER HOUSING

CROSS REFERENCE TO RELATED APPLICATIONS

This application claims the benefit of U.S. Provisional Application No. 60/153,480, filed Sep. 10, 1999.

BACKGROUND OF THE INVENTION

This invention relates generally to ice bucket containers and, more particularly, to ice bucket containers including ice crusher housings.

Through-the-door ice dispensers installed in refrigerators permit consumers to receive crushed ice without opening a refrigerator door. Known ice dispensers include an ice crusher assembly installed within an ice bucket container. The ice crusher assembly is installed adjacent a dispenser opening and is covered by a shroud.

In operation, an auger mechanism moves ice within the ice bucket container towards the ice crusher assembly which crushes the ice. The crushed ice falls through the dispenser opening and into an operator's cup. As the ice crusher operates, pieces of crushed ice may be strewn into the ice bucket container. The strewn crushed ice may collect against the ice bucket container in a clearance between the auger mechanism and the ice bucket container.

When the ice dispenser is idle, the ice collected in the clearance freezes to the ice bucket container. Additionally, because the ice crusher is installed within the ice bucket container, the crushed ice may collect around and freeze to the ice crusher assembly itself. When the ice dispenser is operated again, the auger must overcome the frozen ice clumps to move any additional ice towards the dispenser opening. The ice crusher assembly must also overcome any additional resistance caused by any ice frozen to the ice crusher assembly.

BRIEF SUMMARY OF THE INVENTION

In an exemplary embodiment of the invention, an ice bucket assembly includes an ice bucket container for storing ice, and a housing assembly for enclosing an ice crusher. The housing assembly includes a housing and a cover which is removably installed to permit access to the ice crusher contained within the housing. The housing assembly is located adjacent a dispensary opening at a front of the ice bucket assembly. When the housing is installed, the ice crusher is shielded from the ice bucket container by the housing and the cover, and the ice crusher receives ice from an auger mechanism through an opening in the cover. Crushed ice is delivered to the dispensary opening and because the crusher is contained in the housing, crushed ice is not strewn into the ice bucket container. As a result, crushed ice does not collect in a clearance between the auger mechanism and the ice bucket container. The housing also prevents crushed ice from freezing to the ice crusher and the auger.

DETAILED DESCRIPTION OF THE INVENTION

Figure 1:
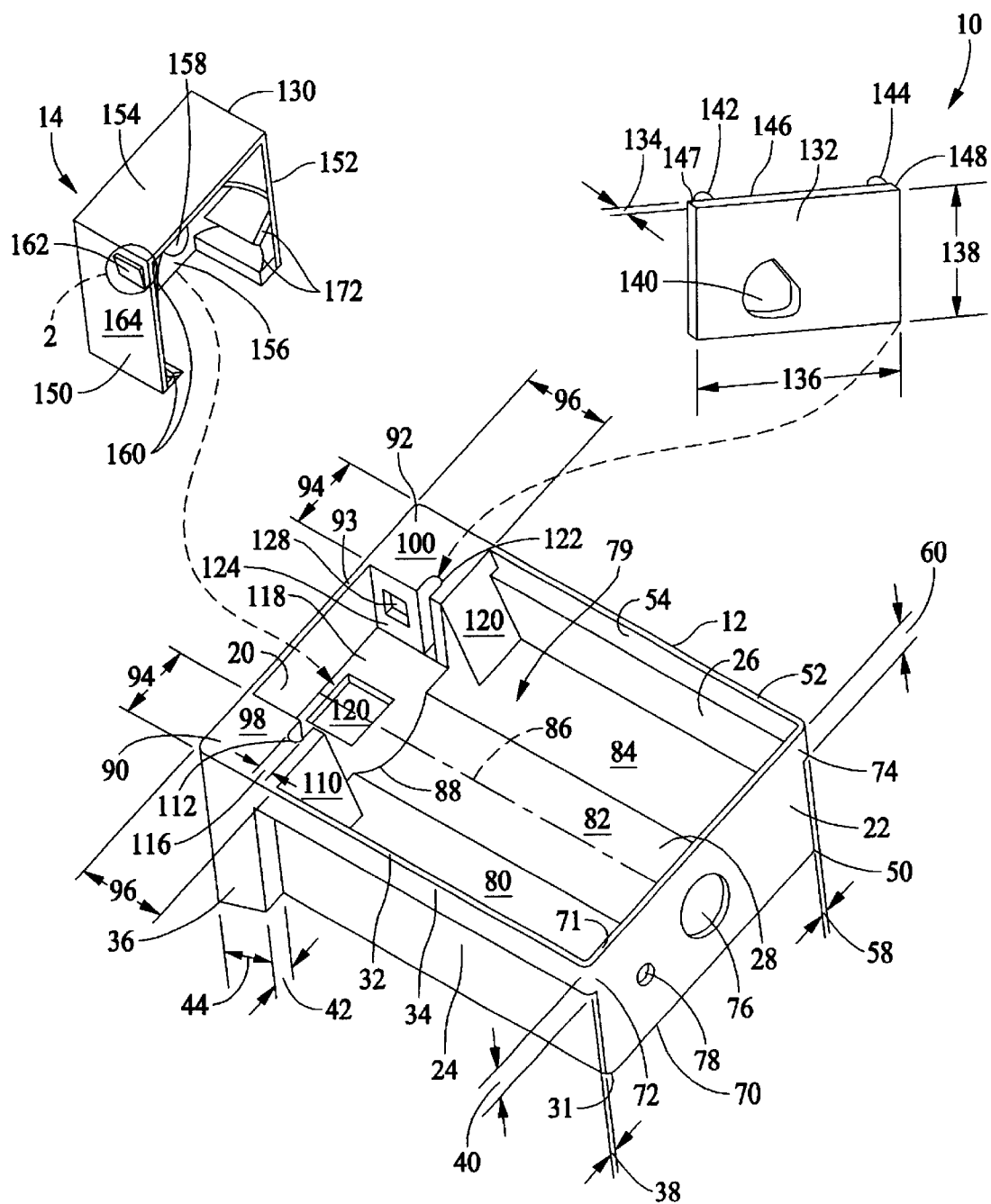
FIG. 1 is a perspective view of an unassembled ice bucket assembly including an ice bucket housing.

FIG. 1 is a perspective view of an ice bucket assembly 10 including an ice bucket container 12 and a housing assembly 14. Container 12 is generally rectangular in shape. Container 12 includes a front wall 20 connected to a back wall 22 with a first side wall 24, a second side wall 26, and a bottom wall 28. First side wall 24 is opposite second wall 26 and front wall 20 is opposite back wall 22.

First side wall 24 includes a bottom edge 30 connected to bottom wall 28, a top edge 32, a ledge 34, and a shoulder 36. Ledge 34 extends outward a distance 38 from first side wall 24. Ledge 34 extends from back wall 22 to shoulder 36 and extends from top edge 32 towards bottom edge 30 a distance 40. Ledge 34 is dimensioned to be received in an ice machine (not shown) included in a refrigerator/freezer (not shown).

Shoulder 36 extends outward a distance 42 from first side wall 24 and extends between first side wall top edge 32 and bottom edge 30. In one embodiment, distance 38 is substantially equal to distance 42. Shoulder 36 provides additional support to ice bucket container 12 and extends from front wall 20 towards back wall 28 a width 44.

Second side wall 26 is constructed substantially identically to first side wall 24 and includes a bottom edge 50 connected to bottom wall 28, a top edge 52, a ledge 54, and a shoulder (not shown). Ledge 54 extends outward a distance 58 from second side wall top edge 52. In one embodiment, distance 58 is approximately equal to distance 38 of first side wall ledge 34. Ledge 54 extends from back wall 22 to the second side wall shoulder and extends from top edge 52 towards bottom edge 30 a distance 60. In one embodiment, distance 60 is approximately equal to distance 40 of first side wall ledge 34. Ledge 54 is dimensioned to be received in the ice machine of the refrigerator/freezer.

Back wall 22 includes a bottom edge 70 connected to bottom wall 28, a top edge 71, a first projection 72, and a second projection 74. First projection 72 extends substantially perpendicularly outward a distance 38 from back wall 22 and is connected to ledge 34 of first side wall 24. Second projection 74 extends a substantially perpendicularly outward distance 58 from back wall 22 and is connected to ledge 54 of second side wall 26. Top edge 71 is connected between first side wall top edge 32 and second side wall top edge 52 and borders first projection 72 and second projection 74. A pair of openings 76 and 78 are disposed within back wall 22. Opening 76 is substantially centered with respect to axis of symmetry 16 and is dimensioned for connection to an ice machine (not shown). Opening 78 is located between opening 76 and first side wall 24 and also is dimensioned for connection to the ice machine.

Bottom wall 28 includes a top surface 79 which includes a first portion 80, a second portion 82, and a third portion 84. First portion 80 is connected to first side wall 24 and third portion 84 is connected to second side wall 26. First portion 80 slopes from first side wall 24 towards container axis of symmetry 16 which moves ice stored within ice bucket container 12 towards container axis of symmetry 16. Third portion 84 is constructed similarly to first portion 80 and slopes from second side wall 26 towards axis of symmetry 16. In one embodiment, first portion 80 and third portion 84 are each substantially planar. Alternatively, first portion 80 is constructed with a curvature extending from first side wall 24 to second portion 82 and third portion is constructed with a curvature extending from second side wall 26 to second portion 82.

Second portion 82 includes an axis of symmetry 86 which extends from front wall 20 to back wall 22. Second portion 82 extends between first portion 80 and third portion 84. Second portion 82 is curved between first portion 80 and third portion 84 and is dimensioned for connection to the ice machine (not shown). Second portion 82 extends from back wall 22 to a lip 88.

Front wall 20 includes a first body portion 90, a second body portion 92, and a top edge 93. First body portion 90 has a rectangular cross-sectional profile and extends substantially perpendicularly from first side wall 24 towards container axis of symmetry 16 a distance 94 and substantially perpendicularly from front wall 20 towards back wall 22 a distance 96. Distance 96 is approximately equal to shoulder width 44. Top edge 93 connects first side wall top edge 32 and second side wall top edge 52 and is substantially co-planar with a top surface 98 of first body portion 90 and a top surface 100 of second body portion 92.

First body portion 90 also includes a rear wall 110, a slot 112, and an inner wall (not shown). Rear wall 110 slopes from first body portion top surface 98 to bottom wall first portion 80. The inner wall extends outward from front wall 20 distance 96 towards back wall 22. Slot 112 is disposed in the inner wall and extends inwardly from the inner wall towards first side wall 24. Slot 112 has a width 116 and extends from top surface 98 to a bottom center panel 118. The inner wall includes an opening (not shown) positioned between slot 112 and front wall 20.

Bottom center panel 118 extends from front wall 20 towards bottom wall 28 to lip 88. Bottom center panel 118 is substantially flat and includes an opening 120 which is substantially centered within bottom center panel 118 with respect to container axis of symmetry 16. Bottom center panel 118 is dimensioned to permit crushed ice to exit ice bucket container 12.

Second body portion 92 is constructed substantially identically to first body portion 90. Second body portion has a rectangular cross-sectional profile and extends substantially perpendicularly from second side wall 26 towards container axis of symmetry 16 distance 94 and substantially perpendicularly from front wall 20 towards back wall 22 distance 96. Distance 96 is approximately equal to the width of the second side wall shoulder. Second body portion 92 also includes a rear wall 120, a slot 122, and an inner wall 124. Rear wall 120 slopes from second body portion top surface 100 to bottom wall third portion 84. Inner wall 124 extends outward from front wall 20 distance 96 towards back wall 22. Slot 122 is disposed in inner wall 124 and extends from inner wall 124 towards second side wall 26. Slot 122 has width 116 and extends from top surface 100 to bottom center panel 118. Slot 122 is positioned axially opposite first body portion slot 112 and is substantially co-planar with slot 112. Inner wall 124 includes an opening 128 positioned between slot 122 and front wall 20.

Housing assembly 14 includes a housing 130 and a cover 132. Cover 132 has a thickness 134, a width 136, and a height 138. Slots 112 and 122 are sized and positioned to receive cover 132. Accordingly, width 116 of slots 112 and 122 is wider than cover thickness 134. Cover 132 includes an opening 140 that permits ice to enter housing 130 from ice bucket container 12. Cover 132 also includes a first tab 142 and a second tab 144 which extend from a top edge 146 of cover 132. First tab 142 is located at a first corner 147 and second tab 144 is located at a second corner 148. Tabs 142 and 144 permit a user to easily grasp cover 132 while cover 132 is being installed or removed from ice bucket container 12.

Housing 130 contains an ice crusher assembly (not shown). Housing 132 includes a first side wall 150 and a second side wall 152 connected to first side wall 150 with a top wall 154 and a front wall 156. Front wall 156 includes a mount 158 which supports the ice crusher assembly. First side wall 150 includes a plurality of shelves 160 which support the ice crusher assembly and a mounting tab 162. Plurality of shelves 160 are mounted on an inner surface (not shown) of first side wall 150 and extend towards second side wall 152. Mounting tab 162 extends from an outer surface 164 of first side wall 150 and is positioned and sized to be received in opening 119 of first body portion inner wall 114.

Second side wall 152 is constructed similarly to first side wall 150 and includes a plurality of shelves 170 which support the ice crusher assembly and a mounting tab (not shown). Plurality of shelves 170 are mounted on an inner surface 172 of second side wall 152 and extend towards first side wall 150. The mounting tab extends from an outer surface (not shown) of second side wall 152 and is positioned and sized to be received in opening 128 of second body portion inner wall 124. Mounting tab 162 and the mounting tab of second side wall 152 permit housing 130 to be removably installed into ice bucket container 12 between first body portion 90 and second body portion 92. In one embodiment, housing 130 is not removable from ice bucket container 12 once installed.

When housing 130 is fully installed in ice bucket container 12, housing top wall 154 is substantially co-planar with first body portion top surface 98 and second body portion top surface 100. Additionally when housing 130 is fully installed and cover 130 is inserted within slots 112 and 122, the ice crusher is enclosed.

Figure 2:
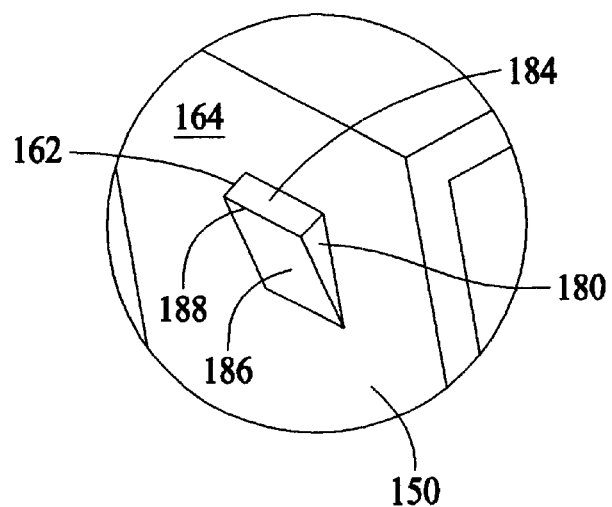
FIG. 2 is a enlarged perspective view of a mounting tab for the ice bucket housing taken along area 2 of FIG. 1.

FIG. 2 is a enlarged perspective view of mounting tab 162. Tab 162 extends from outer surface 164 of housing first side wall 150. Tab 162 has a triangular cross-sectional profile and includes a first side 180, a second side (not shown), a top side 184, and a front side 186. Top side 184 is rectangular-shaped and extends substantially perpendicularly from inner wall 114 to front side 186. The second side and first side 180 are each triangular-shaped and extend substantially perpendicularly from inner wall 114. First side 180 and the second side are positioned oppositely and are formed similarly. Front side 186 slopes from an outer edge 188 of top side 184 to inner wall 114.

During installation, tab 162 is received in opening 119 (shown in FIG. 1) of first body portion inner wall 114. Sloping front wall 186 permits tab 162 to slide easily into opening 119 and substantially flat top side 184 locks tab 162 into opening 119.

Figure 3:
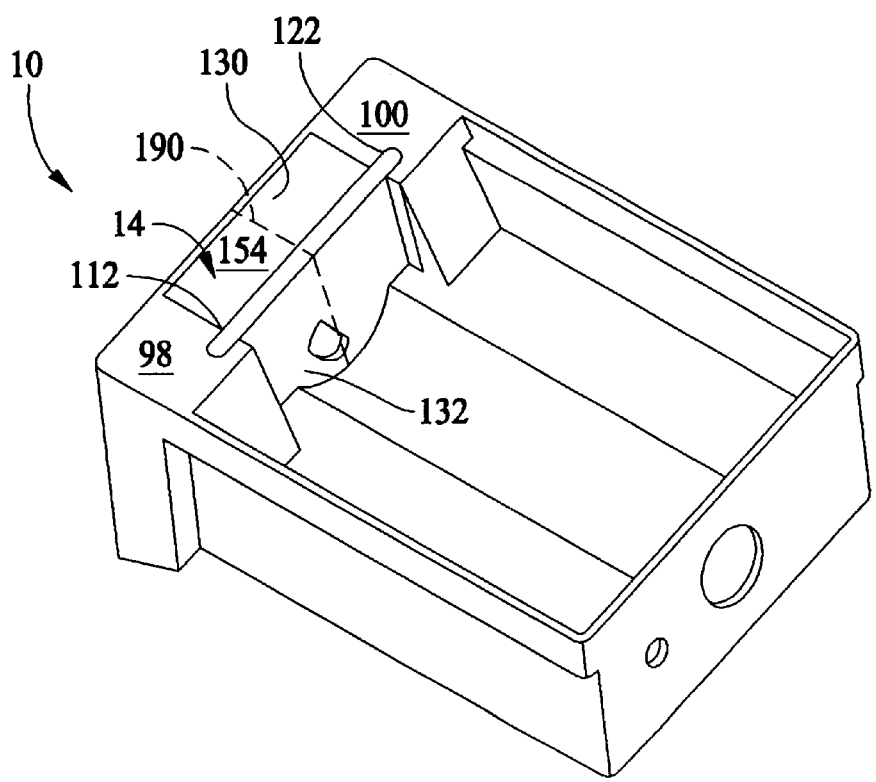
FIG. 3 is a perspective view of the ice bucket assembly shown in FIG. 1 including an installed ice bucket housing.

FIG. 3 is a perspective view of ice bucket assembly 10 including an installed housing assembly 14 in which housing 130 and cover 132 are fully installed in ice bucket container 12. Housing assembly 14 is installed such that an axis of symmetry 190 for housing assembly 14 is substantially co-axial with ice bucket container 12. Housing top wall 154 is substantially co-planar with first body portion top surface 98 and second body portion top surface 100. Additionally cover 130 is inserted within slots 112 and 122 to enclose a cavity (not shown) in which an ice crusher (not shown) is housed. In an alternative embodiment, housing 130 is formed integrally with ice bucket container 14 and is unitary with first body portion 90 and second body portion 92.

The above-described ice bucket assembly is cost-effective and increases the useful life of an ice crusher. The ice bucket assembly includes an ice bucket container configured to store ice, and a housing assembly configured to enclose an ice crusher. The housing assembly includes a housing and a cover which is removably installed. The housing assembly is positioned above a dispensary opening disposed adjacent a front of the ice bucket. As a result, when the housing assembly is installed, the ice crusher is shielded from the ice bucket container by the housing and the cover. Accordingly a cost-effective ice bucket assembly which includes an internal housing is provided.

While the invention has been described in terms of various specific embodiments, those skilled in the art will recognize that the invention can be practiced with modification within the spirit and scope of the claims.

What is claimed is:

1. An ice bucket assembly for storing ice, said ice bucket assembly comprising:

a container comprising a front side, a back side, a first and second side, and a bottom, said back side connected to said front side with said first side, said second side, and said bottom; and a housing assembly configured to be located within and removably attached to said container, said housing assembly comprising a housing and a cover, said housing includes a first side wall, a second side wall, a front wall, and a top wall, said first side wall connected to said second side wall with said front wall and said top wall, said housing assembly further comprising a plurality of tabs extending from said first side wall and said second side wall.

2. An ice bucket assembly in accordance with claim 1 wherein said housing assembly includes an axis of symmetry and said container includes an axis of symmetry, said housing assembly axis coaxial with said container axis.

3. An ice bucket assembly in accordance with claim 1 wherein said container further comprises an opening, a first corner portion, and a second corner portion, said first corner portion and said second corner portion extending from said container front side, said first corner portion extending from said container first side, said second corner portion extending from said container second side, said opening disposed in said container bottom between said first corner portion and said second corner portion, said housing assembly adjacent said container bottom opening between said first corner portion and said second corner portion.

4. An ice bucket assembly in accordance with claim 1 wherein said cover comprises a top side, a bottom side, a first side and a second side, said bottom side connected to said top side with said first side and said second side, said cover further comprising an opening extending through said cover.

5. An ice bucket assembly in accordance with claim 4 wherein said housing assembly is configured to contain an ice crusher assembly.

6. An ice bucket assembly in accordance with claim 3 wherein said first corner portion comprises at least one opening and a slot, said second corner portion comprises at least one opening and a slot, said plurality of tabs configured to engage said first corner portion opening and said second corner portion opening, said first corner portion and said second corner portion configured to receive said housing cover.

7. An ice bucket assembly in accordance with claim 6 wherein said housing is integrally formed with said container, said housing extending between said first corner portion and said second corner portion.

8. A housing assembly configured to be attached to an ice bucket container, said housing assembly comprising:

a housing configured to contain an ice crusher and to be removably installed to the ice bucket container, said housing comprising a first side wall, a second side wall connected to said first side wall with a front wall and a top wall, and a plurality of tabs extending from said first side wall and said second side wall; and a cover attached to said housing, said cover comprising a plurality of tabs extending from said cover and an opening extending through said cover.

9. A housing assembly in accordance with claim 8 wherein said cover is configured to be removably attached to the ice bucket container.

10. A housing assembly in accordance with claim 8 wherein said tabs are configured to engage the ice bucket container.

11. A storage assembly for ice, said storage assembly configured to slide into a freezer, said storage assembly comprising:

a housing assembly comprising a housing, a cover, and a plurality of tabs extending from a first side wall and a second side wall; and a container configured to receive said housing assembly, said container comprises a front wall connected to a back wall with a first side wall and a second side wall, said front wall comprising a first body portion and a second body portion, said front wall first body portion comprises a slot configured to receive said housing assembly cover, said front wall second body portion comprises a slot configured to receive said housing assembly cover, said first and second body portions further comprise at least one opening configured to engage said plurality of tabs.

12. A storage assembly in accordance with claim 11 wherein said housing assembly is configured to contain an ice crusher assembly.

13. A storage assembly in accordance with claim 11 wherein said housing assembly is integrally formed with said container.

* * * * *